United States Patent
Ripley, Sr. et al.

[11] Patent Number: 5,595,021
[45] Date of Patent: *Jan. 21, 1997

[54] TURFING SYSTEMS FOR STADIA

[75] Inventors: Thomas L. Ripley, Sr.; Stephen A. Cataldo, both of Chalfont, Pa.

[73] Assignee: Greentech L.L.C., Richmond, Va.

[ * ] Notice: The term of this patent shall not extend beyond the expiration date of Pat. No. 5,467,555.

[21] Appl. No.: 470,924

[22] Filed: Jun. 6, 1995

[51] Int. Cl.⁶ ................................................ A01G 9/02
[52] U.S. Cl. ................................................ 47/66
[58] Field of Search ................ 47/66 S, 1 F, 1.01, 47/66 SC, 66 N

[56] References Cited

U.S. PATENT DOCUMENTS

| Re. 35,006 | 8/1995 | Ripley, Sr. et al. | 47/66 |
|---|---|---|---|
| 94,202 | 8/1869 | Gustafson | 47/66 N |
| 3,872,621 | 3/1975 | Greenbaum | 47/1.2 |
| 3,916,565 | 11/1975 | Runyon | 47/66 S |
| 3,975,869 | 8/1976 | Bouton | 52/9 |
| 4,058,930 | 11/1977 | Miles | 47/58 |
| 4,067,716 | 1/1978 | Sterrett | 71/24 |
| 4,111,585 | 9/1978 | Mascaro | 404/70 |
| 4,118,892 | 10/1978 | Nakamura | 47/66 |
| 4,216,614 | 8/1980 | Söderberg et al. | 47/17 |
| 4,237,653 | 12/1980 | Cortez | 47/66 N |
| 4,352,256 | 10/1982 | Kranz | 47/17 |
| 4,688,357 | 8/1987 | Deaton | 52/9 |
| 4,837,971 | 6/1989 | Visser | 47/17 |
| 4,907,793 | 3/1990 | Wund | 272/3 |
| 4,926,586 | 5/1990 | Nagamatsu | 47/66 |
| 5,111,630 | 5/1992 | Munsey | 52/126.6 |
| 5,161,709 | 11/1992 | Oestreich | 220/6 |
| 5,187,894 | 2/1993 | Ripley et al. | 47/86 |

FOREIGN PATENT DOCUMENTS

| 2639565 | 3/1978 | Germany . | |
| 307774 | 7/1971 | U.S.S.R. . | |
| 1764583 | 9/1992 | U.S.S.R. | 47/66 S |
| 1426425 | 2/1976 | United Kingdom . | |

*Primary Examiner*—Henry E. Raduazo
*Attorney, Agent, or Firm*—Woodcock Washburn Kurtz Mackiewicz & Norris

[57] ABSTRACT

Improved turf units for assembling a natural turf playing surface in a stadium or the like. Natural turf units are provided which are transportable between first and second locations, the second location being for the growth and maintenance of the turf unit; the first location being a location for the performance of the desired activity. A fence section hingeably connected to the growing pan of the turf unit provides for maintenance of the top level of the plant growing medium at a significant height above the top of the side walls of the growing pan. A turf unit in accordance with the invention is used to assemble such a playing surface without removable parts. Also, the outer periphery of the fence extends outwardly beyond the outer periphery of the side walls of the growing pans such that, when the turf units are assembled adjacent each other to create the playing surface, large areas exist beneath the playing surface to provide adequate space for drainage of the field. Moreover, a configuration of turf units in accordance with the invention provides for a substantial reduction in the amount of growing medium necessary to create the continuous natural grass playing surface when compared with known turf unit systems.

8 Claims, 13 Drawing Sheets

TURFING SYSTEMS FOR STADIA

BACKGROUND OF THE INVENTION

This invention is directed to an improvement in turf units for the provision of natural turf surfaces in environments, such as sports stadia, that are generally unsuited to the continued maintenance and growth of turf. Turfing systems for stadia are known wherein turf plants are grown and maintained in turf units at a location remote from the stadium and, when necessary, transported to the stadium for configuration into a desired playing field. In accordance with such systems, an artificial surface can be transfigured into a natural grass playing surface within a short time period. After use, the turf units may be disassembled and transported back to the growing locations such that the artificial surface of the stadium can be used for other events where a natural grass surface is unnecessary.

One such turfing system is disclosed in the commonly assigned U.S. Pat. No. 5,187,894—Ripley, et al. In the turf units disclosed in Ripley, a growing medium is disposed in growing pans, or trays, wherein substantially entire turf plants are grown and maintained within the growing trays. The level of the top surface of the growing medium, and thus, the level of the turf plants, is maintained at a significant height above the level of the sidewalls of the growing pans. Accordingly, when a plurality of turf units are placed adjacent each other to construct a playing field, a continuous natural grass playing surface is created at a significant height above the level of the growing trays. It is desirable to maintain the level of the playing surface above that of the growing trays so that the trays do not interfere with the participants using the surface. For example, when the natural grass surface is used for a sport such as football where the athletes exert tremendous forces on the turf, the situation must be prevented where the athlete's foot digs into the natural grass playing surface between adjacent turf units such that the athlete's foot comes into contact with the growing trays, perhaps causing injury to the athlete.

In order to provide a playing surface at a significant height above the level of the side walls of the growing trays, the trays are designed such that a barrier, or fence, maintains the growing medium at a level above the top of the sidewalls of the growing trays while the turf units are maintained at the remote growing location. In the patented system discussed above, a removable collar is fitted onto the top edge of the growing pans for maintaining the growing medium at a level above that top edge. When the turf units are assembled together at the stadium, the collars are removed as the turf units are positioned adjacent each other such that the growing medium, along with the turf plants, extending above the top edge of a growing pan contacts the growing medium of the adjacent turf unit.

However, it is known that handling of the collars after they are removed from the growing trays is time consuming since four collar sections are generally used for each tray and a substantial number of trays are used to construct a regular sized athletic field.

Moreover, the growing pans of the above-referenced systems are generally square pans or the like wherein the sidewalls of adjacent pans are abutted against each other when the natural grass surface is constructed. Thus, in these systems the growing medium beneath the playing surface is continuously filled in over the entire area below the playing surface, with the exception of the space taken up by the side walls of the growing pans. Accordingly, these systems require a costly surplus of growing medium and lack space below the playing surface to provide for drainage of excessive water in the event of a rainstorm over an uncovered stadium.

OBJECTS OF THE INVENTION

It is an object of this invention to provide well groomed, natural turf surfaces in stadia or the like where turf is subject to hard use and abuse.

A further object is to provide transportable turf units for use in the provision of turf surfaces in stadia and the like.

Another object of this invention is to improve domed and other stadia through the incorporation of a turf growing location, remote from the location where stadium activities take place, together with means for nurturing turf at the growing location while providing the turf at the activities location when such activities are under way.

A further object of this invention is to provide an improved growing pan of a turf unit which provides for the installation of a large number of turf units to form a playing surface without removable parts and which provides for adequate drainage of water under the playing surface.

Moreover, a configuration of turf units in accordance with the invention provides for a substantial reduction in the amount of growing medium necessary to create a stable and continuous natural grass playing surface when compared with known turf unit systems.

These and other objectives will become apparent from a review of the instant specification and attendant claims.

SUMMARY OF THE INVENTION

In accordance with this invention a plurality of turf units for forming a continuous natural grass playing surface are employed which may be transported either together or individually. The units may be arranged in a plurality of geometries such that areas of wear can be rotated among the units to minimize stress upon individual turf units.

The turf units include improved growing pans with a fence connected to the growing pans for maintaining the top surface of the plant growing medium at a level above the side walls of the growing pans. The outer peripheral surface of the fence extends outwardly beyond the outer peripheral surface of the side walls of the growing pan such that large empty spaces are left below the playing surface when adjacent turf units are placed into position to construct the playing surface.

Preferably, the fence comprises a plurality of fence sections, one fence section per side wall, which are rotatably connected by a hinge to a ledge of the growing pan such that the fence remains connected to the growing pan after the fence is rotated to an open position for installation of the playing surface. In turn, each fence section preferably comprises two fence post segments which are slidably engaged to each other to facilitate operation of the fence section.

It is preferred that the turf units contain a plant growing medium and substantially entire turf plants. Thus, while sod may be used, it is preferred that entire, fully growing and functioning plants be grown and employed. Artificial soils having relatively light weights are preferred in accordance with the invention.

DETAILED DESCRIPTION OF PREFERRED EMBODIMENTS

It has been determined that the maintenance of natural turf in a facility such as a domed stadium cannot be accomplished in conventional ways so as to permit the extensive use of the natural turf surface over a period of years. Thus, while it is possible to maintain natural turf surfaces in stadia used for only a portion of the year such as a football, soccer, or baseball stadium, the hard use accompanying the integration of a plurality of sports or other events into a single stadium is essentially incompatible with the maintenance of natural turf. Notwithstanding this, natural turf surfaces have a multitude of advantages which are appreciated both by the spectators and those individuals whose activities take place upon the turf, especially under a dome. Thus, athletes prefer natural turf surfaces to artificial ones, observing a relatively smaller number of injuries taking place on natural surfaces and improvements in play.

In accordance with the present invention, it is now possible to install natural turf surfaces in domed and other stadia, including stadia for multiple purposes, playing fields, gardens, terraces, building areas and the like while maintaining excellent quality of turf over extended seasons.

This is done by growing turf units in a growing location preferably adjacent to, but in all cases separate from, the location within a stadium or other activities location where the performance of activities takes place. The turf units are grown and nurtured within this second location under conditions adapted particularly for their growing requirements. Such a location may conveniently be considered analogous to a green house specially adapted for the growth and maintenance of turf. The turf unit or units are able to benefit from the particularized conditions optimum for their development for the maximum period of time prior to being exposed to activity conditions. Additionally, varying turf unit or units may be substituted in order to maintain the actual playing or activity surface in optimum condition.

Figure 1:
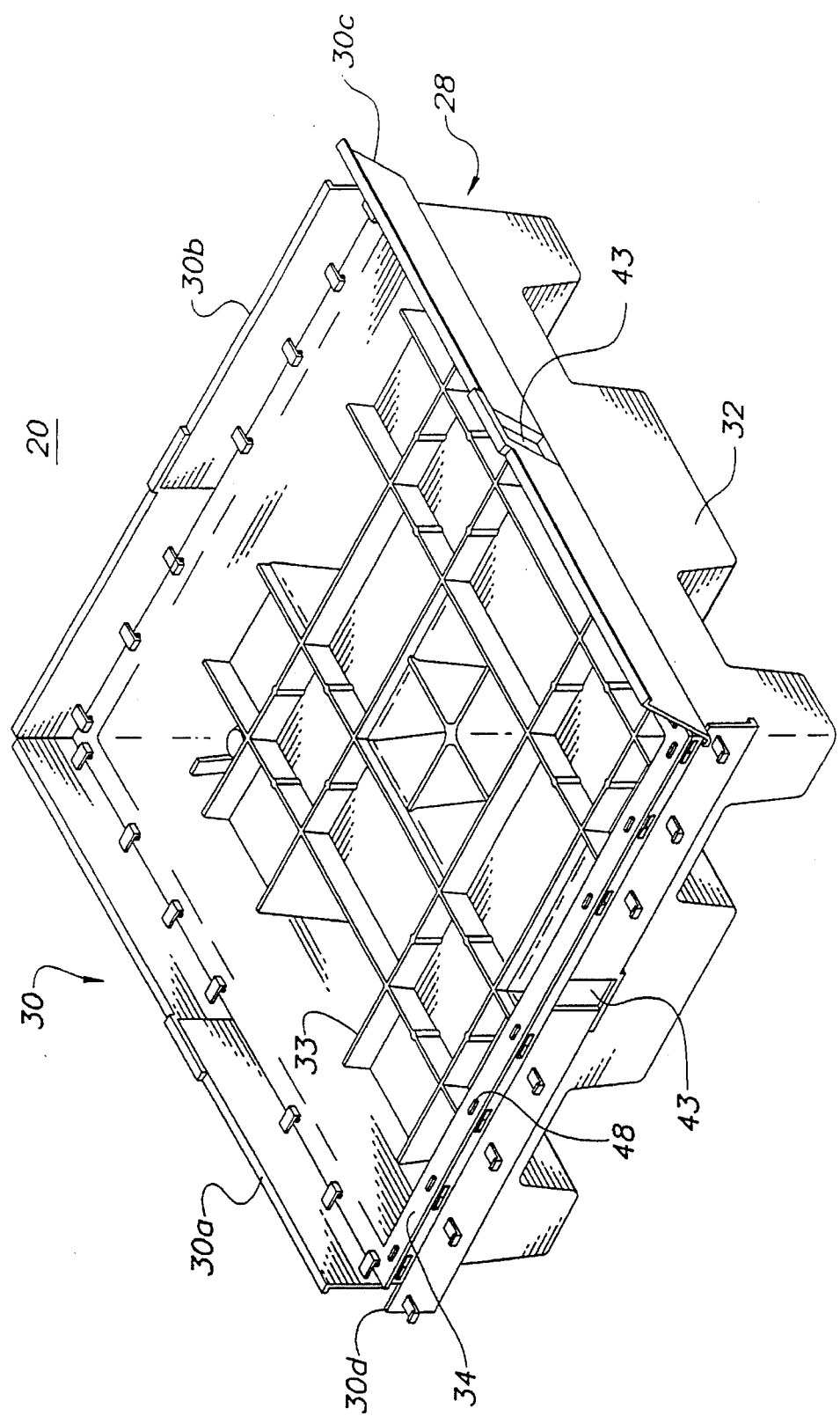
FIG. 1 is a perspective view of a turf unit in accordance with the invention.
Figure 10:
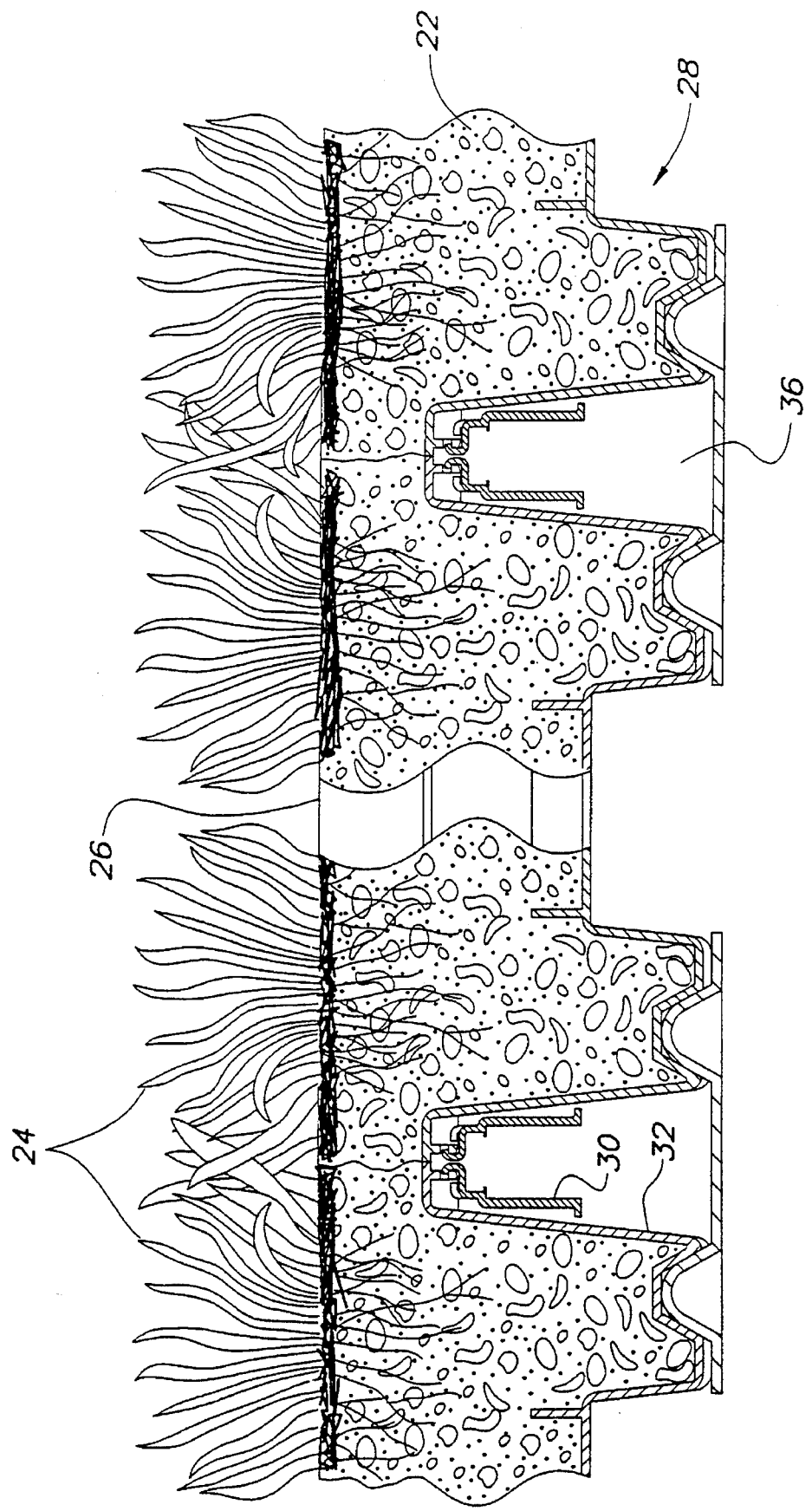
FIG. 10 is a cross-section of a playing surface depicting a plurality of turf units having growing plants in place.

FIG. 1 depicts a turf unit 20 in accordance with the invention. Referring for the moment to FIG. 10, when in use for creating a natural turf activity surface, turf unit 20 is adapted for containing growing medium or soil 22 which is preferably adapted to be, at once, an effective medium for the growth of turf plants and to have a relatively light weight to facilitate transportation. A plurality of turf plants 24 are provided at or adjacent to the soil level 26 extant in the turf unit. As will be noted, the turf plants 24 are substantially entire comprising not only full, leafy growth but also an essentially complete root system. The root system, as can easily be appreciated by a person of skill in the art, will interpenetrate the growing medium, thus forming an integrated mass of growing medium and root structure interleaved among the baffling arrangement of the unit described below. This entire arrangement, conveniently referred to as turf, is healthy and vigorous due to its nurturing in a growing environment optimized for its development; it is also transportable.

Figure 11:
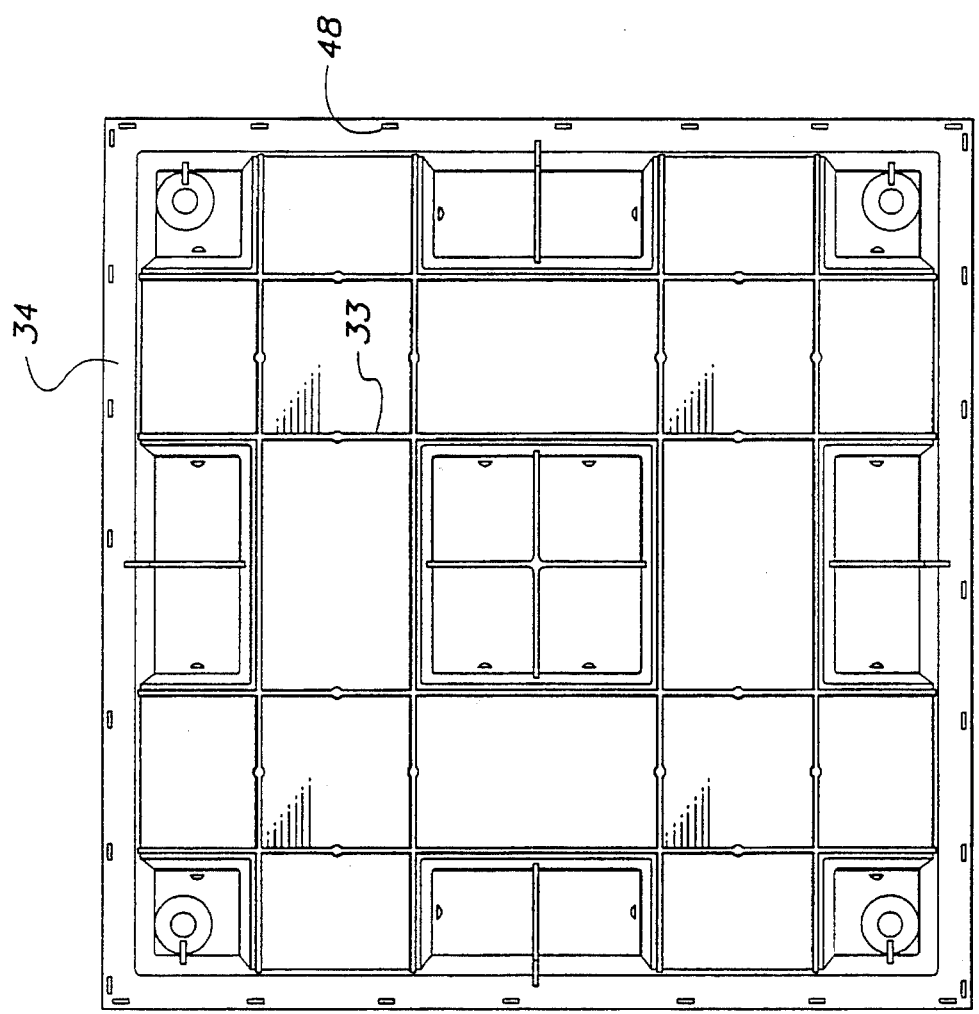
FIG. 11 is a top view of a turf unit with the fence removed.

Referring once again to FIG. 1, the turf unit 20 includes a growing pan 28, or turf tray, having side walls 32 and which is preferably molded from a durable plastic material. Other forms of a growing pan may be employed in accordance with this invention having different geometries and the like. As shown in FIGS. 1 and 11, a baffling arrangement comprising baffles 33 are preferably provided within the interior of the growing pan. Baffles 33 facilitate settling of the growing medium within the growing pan.

As set forth above, it is preferable that the growing medium be maintained at a significant height above the top of the side walls 32 of the growing pan 28 while the turf unit is at a remote storing location, as well as during transport of the turf units to the stadium. Accordingly, fence 30 is connected to the growing pan and, when in the "closed" position, provides a barrier for maintaining the growing medium, as well as the turf plants, at the desired height above the side walls. With the fence in the closed position, growing medium and the turf plants can be filled into the growing pan up to a level near the top of the fence and maintained therein while the turf units are stored at a remote location. When it is desirable to assemble a continuous natural grass playing surface, a plurality of turf units are transported to the stadium or the like, preferably with the fence in the closed position. Just prior to assembly of the field, the fence is moved into the "open" position in the manner described below to expose the growing medium and turf plants at a significant height above the level of the top of the side walls 32. As shown in FIG. 10, when the turf units are placed into location adjacent each other a continuous playing surface is formed with a soil level 26 at a significant height above that of the top of the side walls 32 of the growing trays 28.

Figure 2:
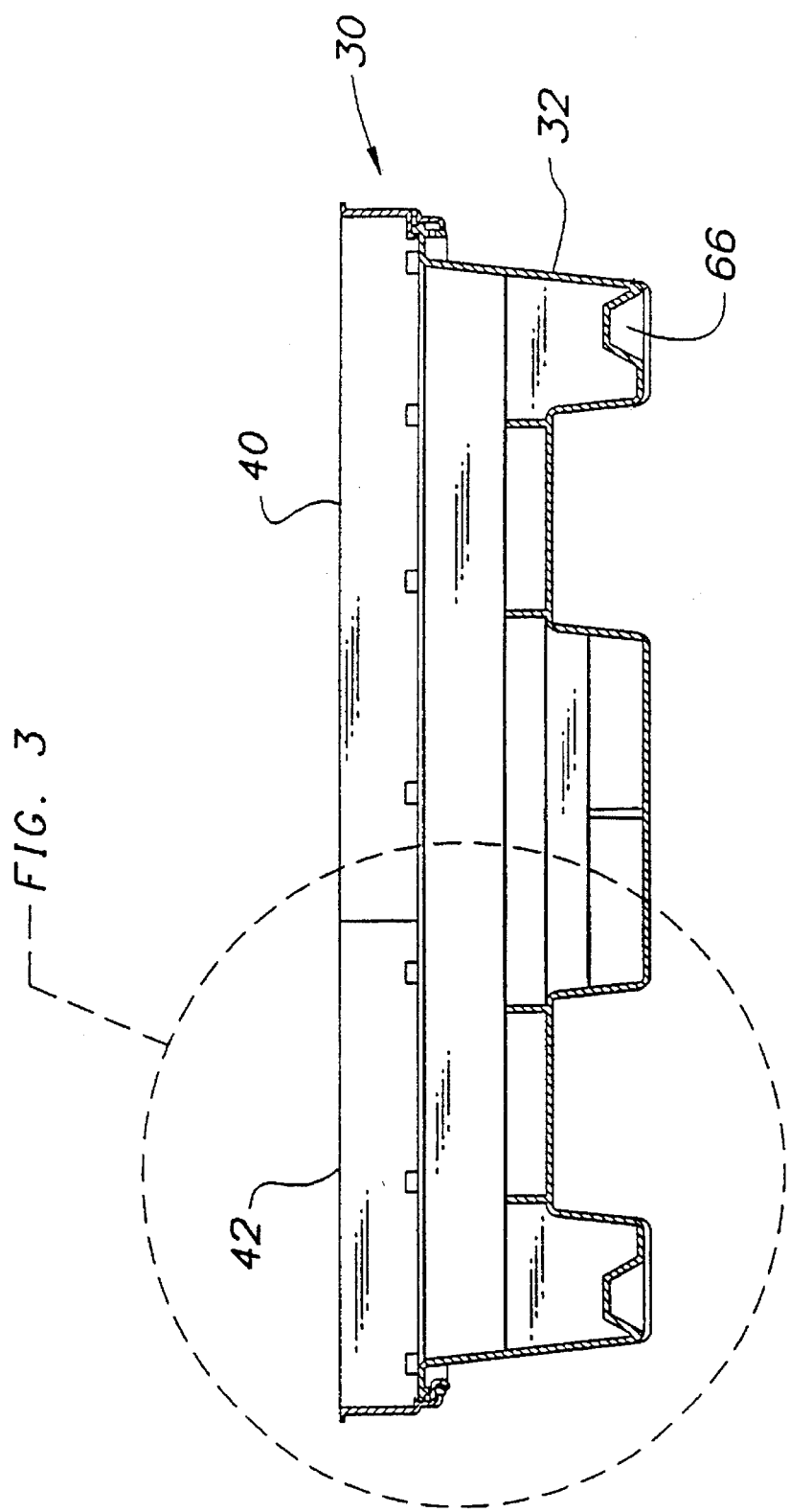
FIGS. 2–4 disclose a turf unit in accordance with the invention with emphasis on a fence hinge section.
Figure 3:
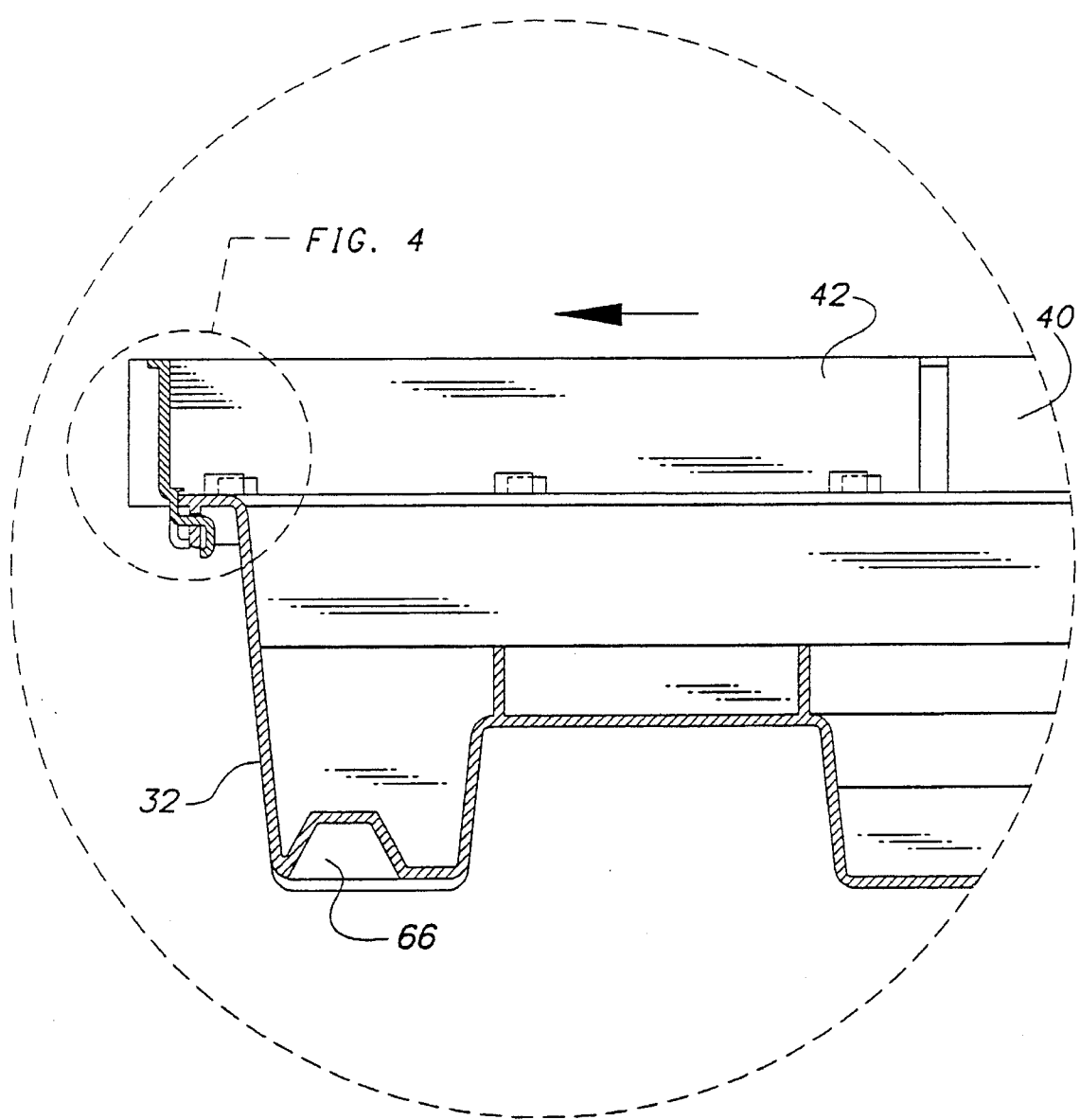

Referring to FIGS. 1 and 2, in a preferred embodiment fence 30 is connected to the top ledge 34 of the growing pan 28 such that the outer peripheral surface of the fence 30 extends outwardly beyond the outer peripheral surface of the side walls 32 of the growing pan. Preferably, the top ledge 34 is integrally molded with the side walls 32 of the growing pan. Thus, as shown in FIG. 10, when the fence is retracted to the open position and the turf units are positioned adjacent each other, large gaps 36, or empty spaces, are formed between the side walls of adjacent units below the playing surface. As shown, the growing medium is supported above the gaps 36 by the top ledges 34 of adjacent growing pans.

The large empty spaces of the gaps 36 provide areas for drainage below the level of the playing surface where the playing surface is used in an outdoor facility that is exposed to rain or snow or the like. Moreover, a continuous natural grass playing surface is fully supported by turf units in accordance with the invention without an unnecessarily large expenditure of growing medium beneath the playing surface, as compared with known turf systems where the side walls of adjacent turf units are abutted directly against each other and no significant gaps exist under the playing surface. As a result, significant cost savings are provided in the formation of a continuous playing surface in accordance with the invention.

Referring to FIGS. 1–4, operation of a fence in accordance with a preferred embodiment of the invention is described. Fence 30 comprises a plurality of fence sections 30a–30d, with a fence section being connected to the ledge 34 above a corresponding side wall 32 of the growing pan. Each fence section of the fence 30 is hingeably connected to the ledge 34 of the growing pan such that the fence sections are rotatable from the closed position to the open position and remain connected to the growing pan when in the open position. As shown in FIG. 1, two of the fence sections 30a, 30b are in the closed position, while another section 30c is partially open and the fourth fence section 30d is in the open position.

Each fence section is further broken down into a long fence segment 40 and a short fence segment 42 (FIG. 2). In order to facilitate rotation about the hinge of each of the fence sections from the closed position to the open position, the long and short fence segments are slidably engaged on the ledge 34. Thus, the long and short fence segments can be slid apart, leaving the opening 43 (FIG. 1). As shown with respect to fence section 30c of FIG. 1, the long and short fence segments of one of the fence sections are slid apart before the fence section is rotated to the open position. As shown, when the long and short fence segments are slid apart, a portion of each of the segments extends out beyond each of the transverse side walls such that either one fence section, or oppositely opposed fence sections, can only be rotated to the open position at a time. When the fence section 30d is rotated about the hinge to the open position the long and short fence segments are slid back together to facilitate opening of the adjacent fence sections. Accordingly, the fence sections remain movably connected to the growing pans when the turf units are installed to construct a natural turf playing surface or the like.

A preferred embodiment of a fence section hinge in accordance with the invention is described with reference to FIGS. 3–9. As shown in FIG. 5, the hinge for each fence section comprises a plurality of hinge sections 44a, 44b disposed along the length of the fence section. In a preferred embodiment, the hinge sections are integrally molded to the fence sections using known injection molding systems. The hinge sections 44a and 44b are alternatingly spaced along the length of a fence section so as to provide for locking of the fence section in the closed position and to facilitate rotation of the fence section to the open position in the manner described below.

Figure 4:
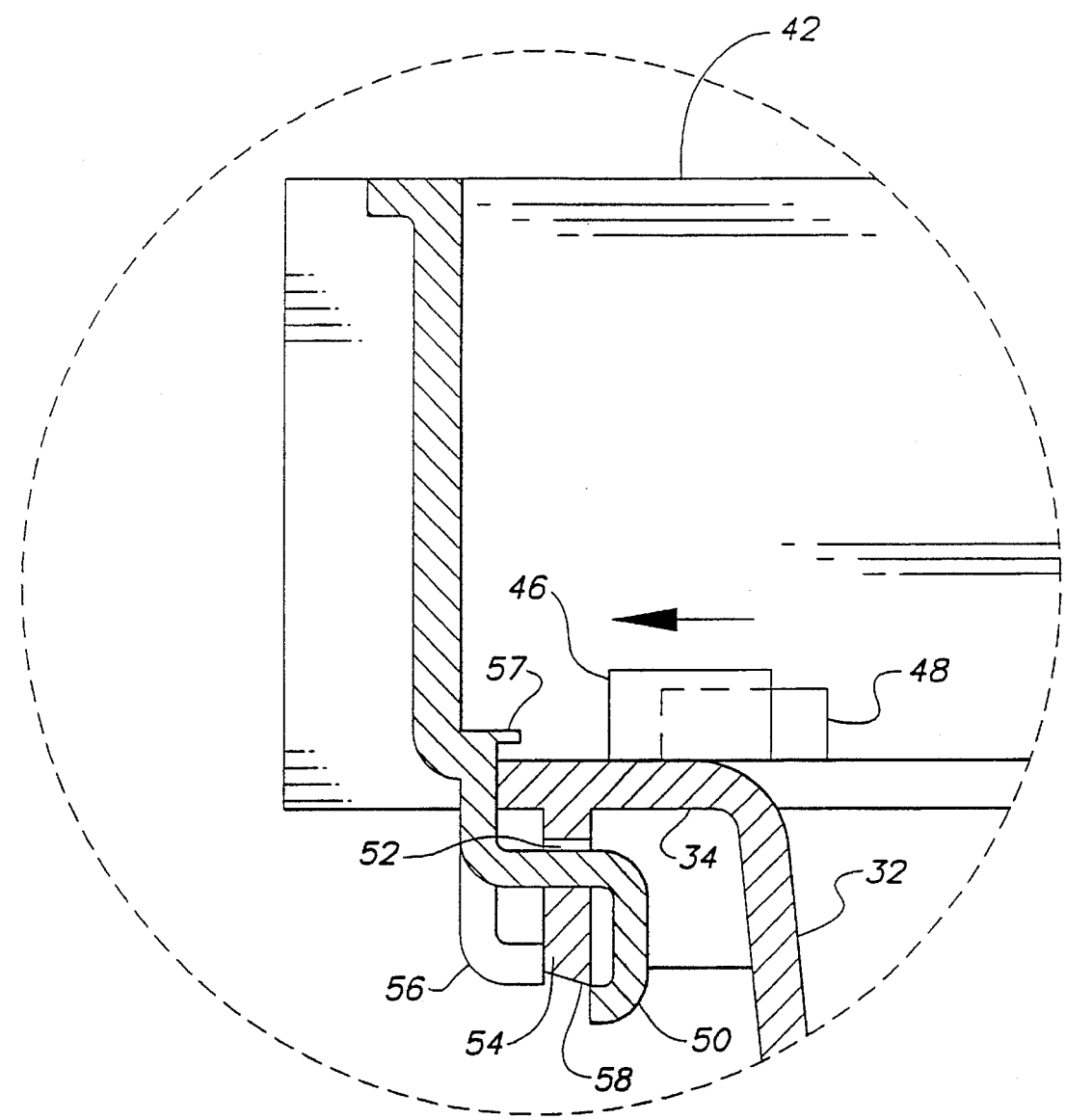
Figure 5:
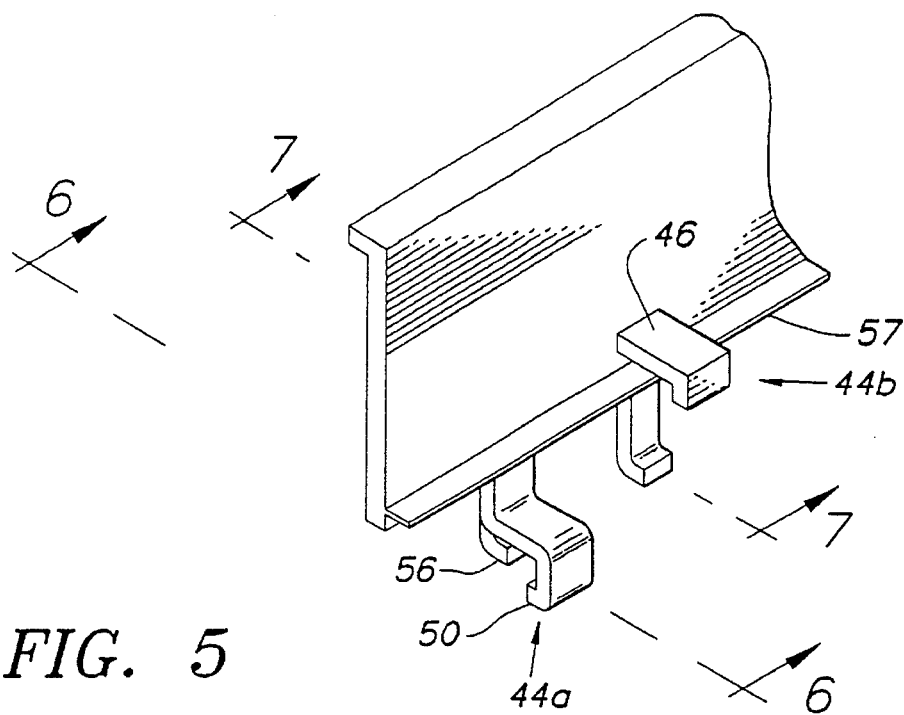
FIG. 5 shows a broken away view of a fence hinge section.

In the closed position, the projection 46 of hinge section 44b is engaged over one of the tabs 48 formed on the top ledge 34 of the growing pan 28 (FIGS. 1 and 4). Accordingly, the projection 46 engages the tab 48 such that the fence section cannot be inadvertently separated, or pulled away from, the top ledge of the growing pan. When it is desirable to lower the fence section to the open position below the top level of the side walls, the long and short fence segments 40, 42 are slid apart on the top ledge such that the projection 46 slides over, and out of engagement with, the tab 48, as shown in FIG. 4 where the short section is partially slid into position.

Figure 8:
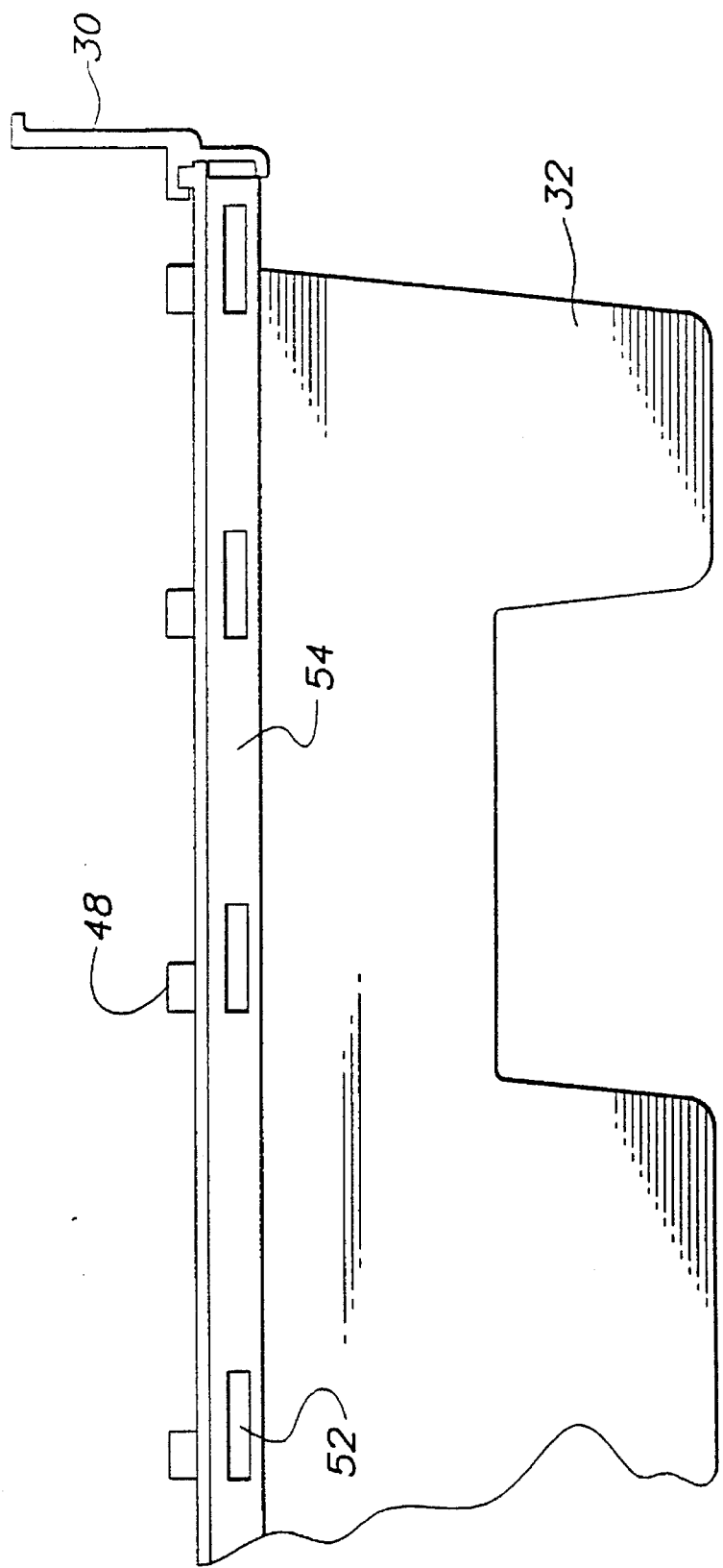
FIG. 8 is a partial side view of a growing pan in accordance with the invention.
Figure 9:
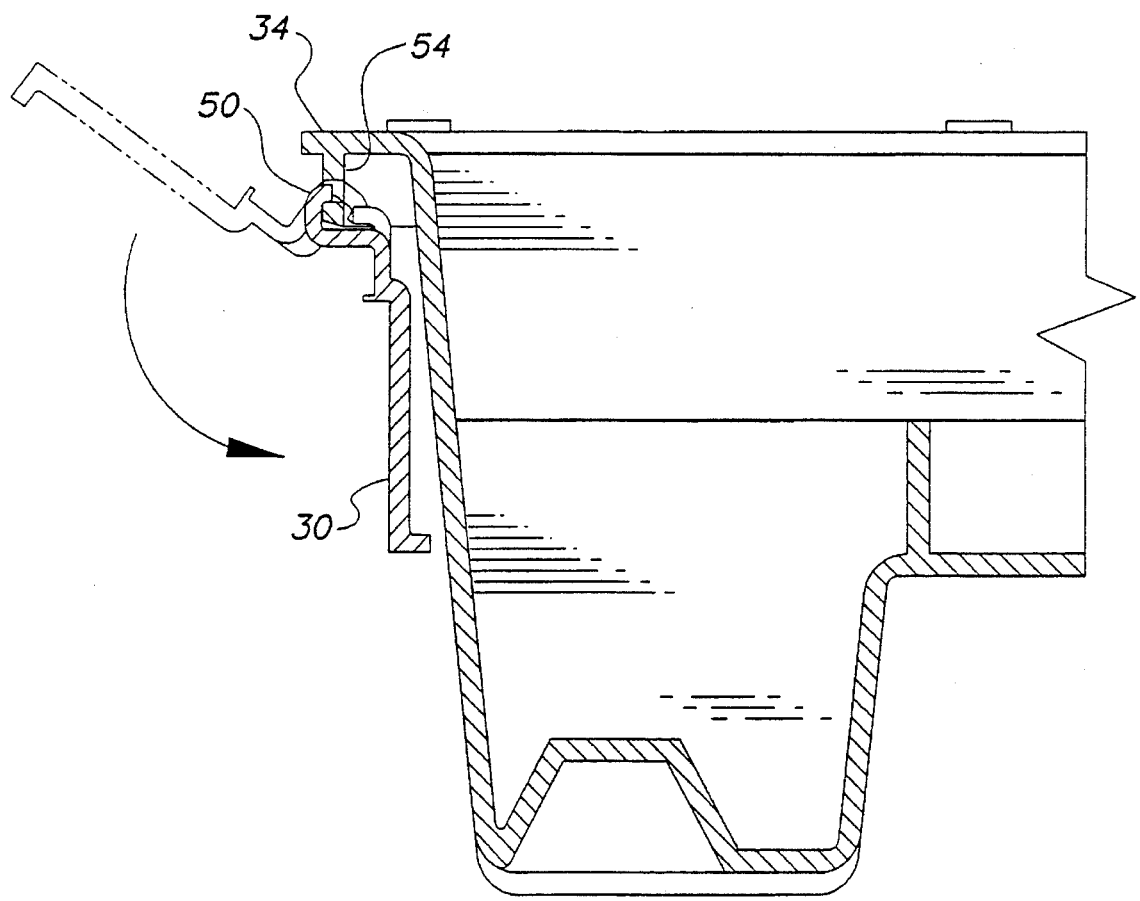
FIG. 9 depicts the operation of a fence hinge section in accordance with an embodiment of the invention.

Regarding the hinge section 44a, as shown in FIG. 8, hook 50 is secured within slots 52 in the railing 54 disposed beneath the top ledge 34. It should be noted that the fence section is not shown for the side wall 32 of the growing pan shown in FIG. 8 so as to show the railing 54 and slots 52 clearly. When the long and short fence segments are slid apart on the top ledge, the hook 50 slides freely in the slots 52. Support section 56 of the hinge section 44a is slidably engaged upon a surface of the railing 54 and slides along the railing when the fence segments are separated. Guide 57 extends longitudinally along the length of the fence section and extends over the top of the ledge 34 of the growing trays when the fence is in the closed position.

When the fence section is rotated into the open position (FIG. 9), after the long and short fence segments have been slid apart, the hook 50 rotates around the railing 54 and into the open position where the hook hangs on the railing in the slot 52. The bottom section 58 of the railing is chamfered to facilitate rotation of the support section 56 around the railing and the width of the slot is dimensioned so as to allow the hook to rotate freely around the railing (FIG. 4). Preferably, the hook is dimensioned such that the hook hangs on the railing within the slots 52 and the fence section remains connected to the growing pan when the fence is in the open position. After the fence section is rotated to the open position, the long and short fence segments are slid back together to facilitate opening of the adjacent fence sections. Accordingly, the system operator is not required to remove and store the fence sections at a remote facility when the ledge sections of the growing pans are abutted against each other during installation of the turf units.

When the playing surface is no longer necessary in the stadium or other activity location, the turf units are broken apart and the fence sections of the turf units can simply be slid apart and rotated back to the closed position for maintaining the growing medium during transport and storing of the turf units at a remote location.

Figure 12A:
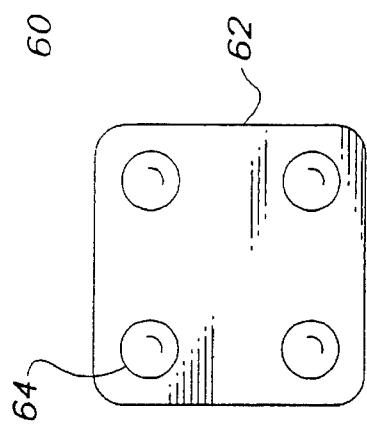
FIGS. 12a and 12b depict a turf unit locator in accordance with the invention.
Figure 12B:
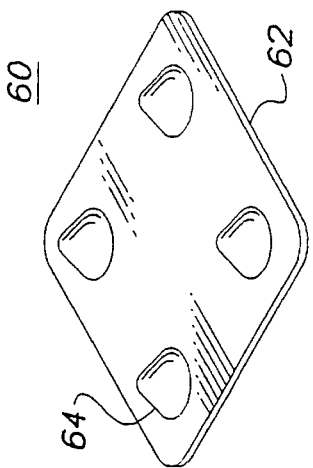
Figure 13:
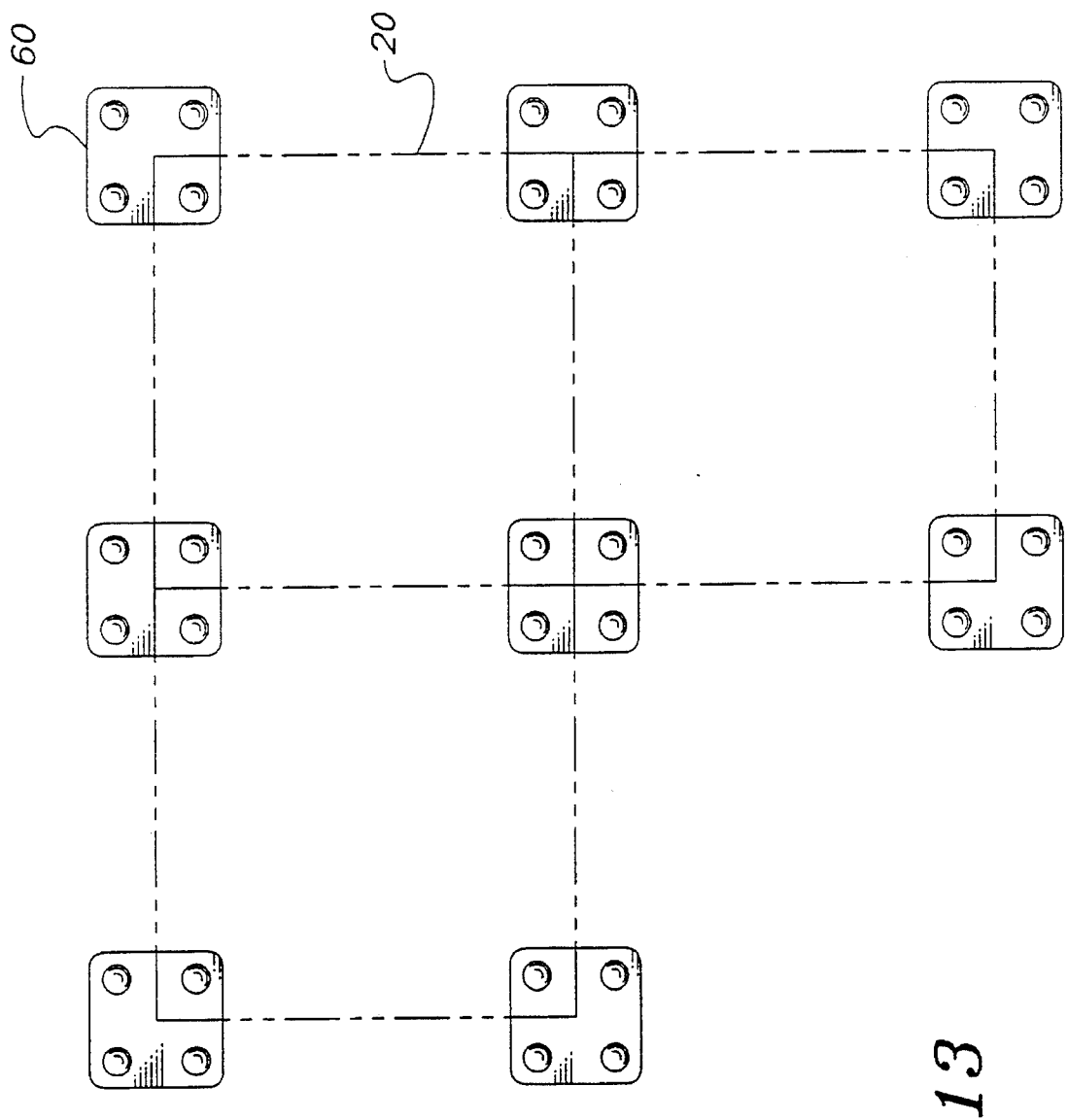
FIG. 13 shows a schematic of the orientation of turf units and locators for creating a natural turf playing surface in accordance with the invention.

FIG. 13 depicts a plurality of turf units 20, shown as dotted lines, arrayed in a geometric configuration as would be the case when placed in the first location within a domed stadium or the like. The turf units 20 are fastened together with fastening means 60 to form an integrated turf. Referring to FIGS. 12a and 12b, in the preferred embodiment shown, fastening means 60 comprise locator pads 62 having a plurality of cone locators 64 extending up from the locator pads. Referring to FIG. 2, when the turf units are placed into position to construct the playing surface, the turf units are disposed onto the locator pads such that the cone locators 64 are received in wells 66 in the bottom surface of the growing trays 28. When the growing trays are a square shape as shown, four cone locators at the corners of locator pads 62 conveniently locate the growing trays into position and hold the growing trays in place adjacent each other. Thus, adjacent growing trays are fastened together such that the turf units do not separate under the influence of the stresses exerted on the playing surface by the athletes using the turf.

Following installation and integration of the turf units into an activity surface at the first location of the stadium, the turf is then prepared for the activities such as by mowing, the application of markings, and the like. Following a particular activity, the turf units may be removed and returned to the second location for continued maintenance and growth. Accordingly, the units are separated from each other and the fence sections are slid apart, rotated to the closed position above the top ledge, and slid back together in the manner described above. Backfilling with additional soil, if needed, is accomplished and the units are transported from the first location back to the second location. It will be appreciated that the turf units need not be oriented, inter se in the same way each time they are assembled at the first location. Thus, turf units may be located on a rotating basis to permit an evening out of the wear patterns on the turf. To this end, the turf units are simply placed into the new position such that the well 66 of the growing trays are placed into position onto the appropriate locators 64 of the locator pads 62. Additionally, larger quantities of turf units may be maintained than are actually needed to prepare any particular activity surface so to permit the interchange of new units with those having been exposed to heavy use.

It will be appreciated that a wide variety of geometries may be employed in the utilization of turf units of the present invention. Thus, while rectilinear turf units have been depicted, other geometries such as hexagons, trapezoids, and the like may be used to good effect. This is particularly the case since most turf-based activities are rectilinear in format. It may be preferred to employ non-rectilinear geometries or non-rectilinear arrangements of rectilinear turf units in connection with such activities to avoid having sidelines and the like coincide with seams in the pattern of turf units. For such designs, hinged fence sections which maintain the growing medium at a significant height above the top of the side walls of the growing pan and remain connected to the growing pan after opening can be suitably designed.

The turf units in accordance with the present invention such as the growing pans depicted in the figures can be formed from many materials. Thus, a wide variety of metals, preserved woods, and plastics can be so employed. It is greatly preferred, however to employ plastics in the formulation of such units. A wide variety of plastics can be so employed although reinforced polyalkylenes, especially fiberglass reinforced polyethylene are preferred. It will be appreciated that such materials can easily be molded, formed and the like, that they may be formulated inexpensively from recycled materials, that they are extremely tough and durable, that they are essentially inert to plant growth chemistry, and that they may be modified easily to accept wheels, clips, and other implementia which may be convenient in the practice of the present invention. Thus, it is preferred to provide integral growing pans to form the turf units of the invention. Such integral pans would comprise, on an integral basis, the top ledge, side walls, stretchers, and bottom areas, with drainage holes integrally formed or drilled separately. The fence sections and their respective hinges are also preferably molded from the same material chosen for the growing pans.

The turf units of the present invention can be used for other purposes in addition to the turfing system set forth herein. Thus, they can be employed in any circumstances where plant growth is desired, but relatively low weights are preferred. Thus, such medium may be used in roof top gardens in planters and in many other circumstances. Since the expanded polymers used in the growing media of the present invention are easily compressible, these mixtures are preferred for use in constricted containers for all-season exposure. As will be appreciated, freezing water in rigid containers may cause destruction of the containers through expansion of the freezing water. The expanded polymers of the present invention remain preferably deformable even under very cold conditions such that freezing water may deform the polymers rather than the containers containing them.

A wide variety of turf grass species may be employed in connection with the present invention. Thus, turfgrass species may be selected for the particular growing conditions extant in the areas where the turf is to be grown and maintained. Pluralities of cultivars of the turfgrass species are preferred for conventional reasons. Thus, blends of kentucky-blue grass, perennial ryegrass, fescues, bermuda grasses and bentgrasses may be employed depending upon the particular circumstances of each installation. The selection, seeding, nurturing, and maintenance of these turfgrass species takes place in accordance with the present invention in the normal fashion; both the turf units and the plant growth media provided herein are amenable to conventional growing and nurturing techniques.

Figure 14:
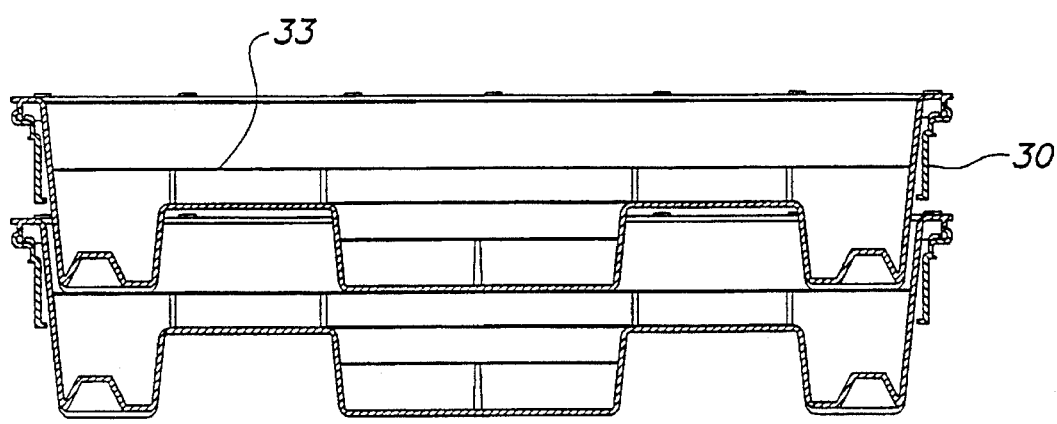
FIG. 14 depicts stacking of growing pans having the attached fence in accordance with the invention.
Figure 7:
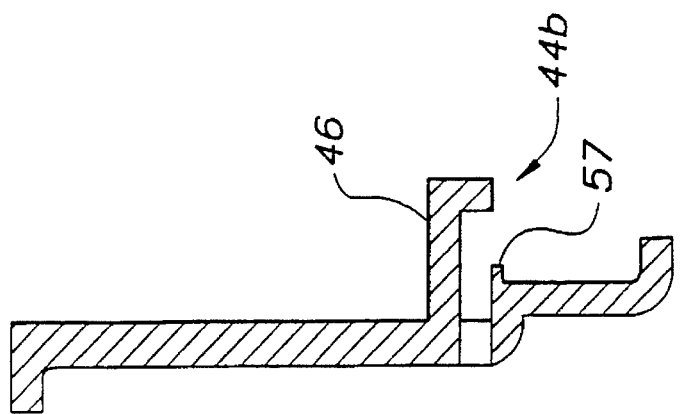
FIG. 7 is a cross-sectional view of a hinge taken along the lines 7—7 of FIG. 5.
Figure 6:
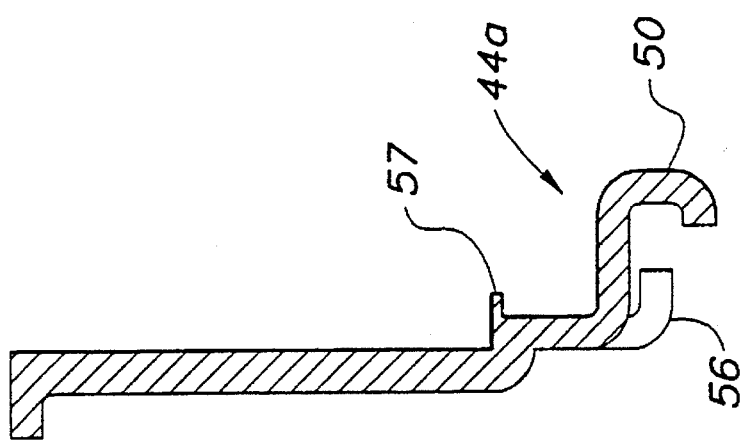
FIG. 6 is a cross-sectional view of a hinge taken along the lines 6—6 of FIG. 5.

As shown in FIG. 14, prior to filling of the turf units with the growing medium for growing the substantially entire turf plants, the growing trays 28, with the fence sections disposed in the open position, can be conveniently stacked inside each other to conserve storage space. The bottom surface of one growing pan is placed into location above the baffling arrangement 33 of the receiving growing pan. Accordingly, with the growing trays being adapted for stacking and storage with the fence sections in the open position, it is not necessary to store the barrier for maintaining the growing medium within the growing trays at a separate location.

Figure 15:
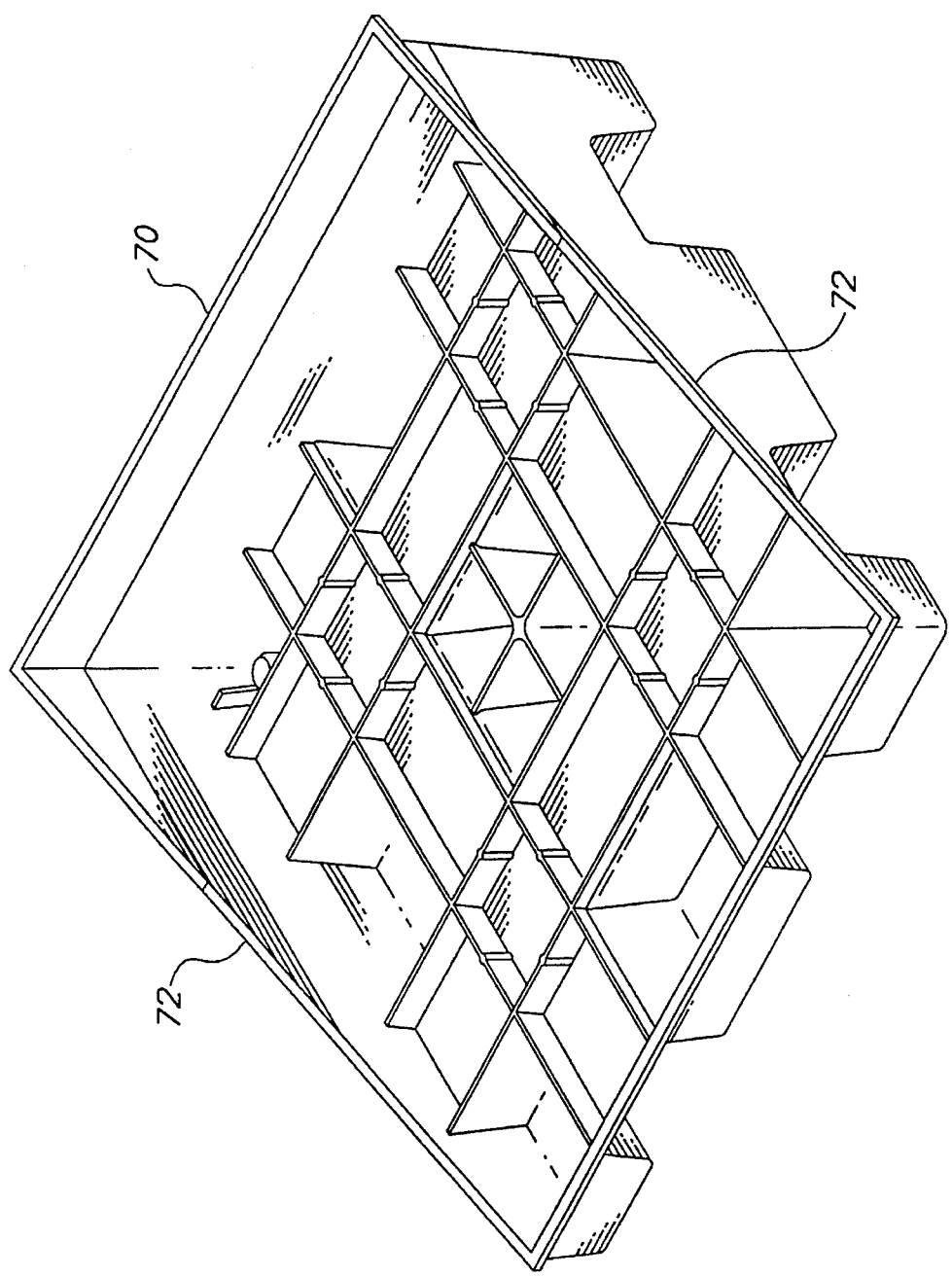
FIG. 15 shows a growing pan having angled sides.
Figure 16:
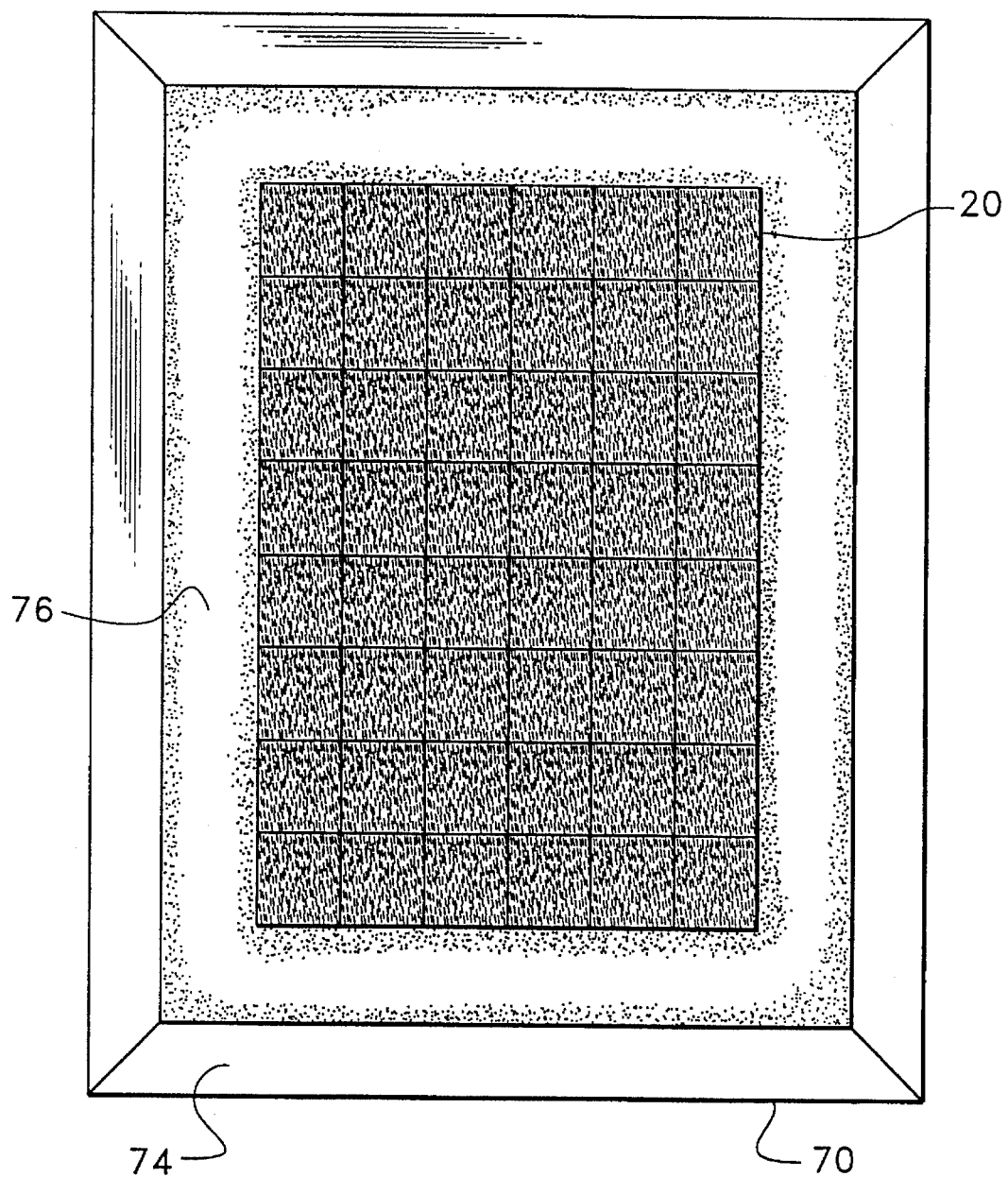
FIG. 16 shows a natural turf playing surface having an angled border.

In a further embodiment, shown in FIG. 15, growing pan 70 has angled sides 72. Such a growing pan 70 can be filled with a synthetic rubber material or the like. As shown in FIG. 16, when a plurality of rubber filled angle-sided growing pans 70 are placed adjacent each other around the outside of a natural grass playing surface constructed of turf units 20, an angled border 74, having a rubber surface, is created around the playing surface. Also, the previously described growing pans 28 can be filled with a synthetic rubber material and positioned around the outer surface of the natural grass playing surface to create a flat border 76, having a rubber surface, around the playing surface. The rubber flat border 76 can be used for the player's bench area and motorized equipment vehicles or the like can operate on the rubber surface.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A turf unit for a transportable, natural turf activity surface, comprising:

a growing pan containing plant growing medium together with growing, substantially entire, turf plants, said growing pan comprising:

a bottom surface;

a plurality of sidewalls connected to said bottom surface and having a top edge;

a fence section hingeably connected to the top edge of each one of said sidewalls, said fence section being adapted for containing said plant growing medium together with growing, substantially entire, turf plants when said fence section is in a closed position above the top edge, said fence section being rotatable about the hingeable connection to an open position below the top edge.

2. The turf unit of claim 1, wherein said fence section comprises first and second fence segments.

3. The turf unit of claim 2, wherein said first and second fence segments are slidable on said top edge of each one of said sidewalls.

4. The turf unit of claim 3, wherein said first and second fence segments are slid together to the closed position above the top edge such that a portion of said first fence segment overlaps with a portion of said second fence segment and wherein said first and second fence segments are slid apart prior to rotating said first and second fence segments about the hingeable connection to an open position below the top edge.

5. The turf unit of claim 4, the top edge of each one of said sidewalls having an upper and lower surface, said growing pan having a rail having a plurality of slots on said lower surface, wherein each of said first and second fence segments have a plurality of hinge sections engaged in a corresponding one of said slots.

6. The turf unit of claim 5, wherein said hinge sections are slidable on said rail and rotatable about said rail.

7. The turf unit of claim 6, said growing pan having a plurality of engagement posts on said top ledge of each of said sidewall, wherein a portion of each said hinge section engages a corresponding engagement post when said fence segments are in the closed position.

8. The turf unit of claim 1, said growing pan further having fastening means for removably attaching said growing pan to another like growing pan.

* * * * *